United States Patent [19]

Naruse

[11] 4,239,637
[45] Dec. 16, 1980

[54] MAGNETIC MATERIAL FOR RECORDING MEDIA

[75] Inventor: Tunehide Naruse, Yokohama, Japan

[73] Assignee: Victor Company of Japan, Limited, Yokohama, Japan

[21] Appl. No.: 10,265

[22] Filed: Feb. 7, 1979

[30] Foreign Application Priority Data

Feb. 10, 1978 [JP] Japan ................................. 53/14774

[51] Int. Cl.³ ...................... C04B 35/26; C04B 35/36; C04B 35/38
[52] U.S. Cl. .............................. 252/62.54; 252/62.55; 252/62.56; 252/62.6; 252/62.62; 252/62.64; 427/128; 427/132
[58] Field of Search ............... 252/62.54, 62.55, 62.56, 252/62.6, 62.62, 62.64; 427/128, 132

[56] References Cited

U.S. PATENT DOCUMENTS 3,740,266  6/1973  Akashi et al. ................. 252/62.54 X
4,002,804  1/1977  Akashi et al. ................. 252/62.56 X Primary Examiner—Jack Cooper
Attorney, Agent, or Firm—Lowe, King, Price & Becker

[57] ABSTRACT

A magnetic material for magnetic recording media, comprising acicular particles of a conventional magnetic material and a ferrite powder amounting to about 0.5–20 Wt% of the acicular particles. Preferably the ferrite powder has a roundish particle shape. The use of this magnetic material in the form of a dispersion of the acicular magnetic particles and the ferrite particles in a usual binder makes it possible to afford improved rectangular ratio to the recording media by a conventional orientation process.

3 Claims, No Drawings

MAGNETIC MATERIAL FOR RECORDING MEDIA

BACKGROUND OF THE INVENTION

This invention relates to a magnetic material for magnetic recording media, which material is of the type comprising acicular particles of a magnetic substance.

Magnetic recording media such as tapes for magnetic recording are produced commonly by coating a plastic base with a magnetic material which is a dispersion of a magnetic powder in a liquid phase binder and thereafter solidifying the binder on the base by drying. To produce a magnetic tape which exhibits a relatively high rectangular ratio, usually use is made of a magnetic material whose magnetic component is a magnetic powder having a needle-like or acicular particle shape, and the base coated with the magnetic material is passed through a magnetic field before drying of the coating in order to orient the acicular particles such that the major axis of each particle becomes parallel to the direction of the magnetic field. A high rectangular ratio tape obtained through the orientation process exhibits excellent recording and reproducing characteristics.

Theoretically, the rectangular ratio of the tape can be raised by increasing the magnetic field strength for the orientation. In practice, however, it is almost impossible to make the strength of a magnetic field for the orientation more than about 3000 oersteds by means of a permanent magnet. In the case of using a coil, a huge apparatus and a corresponding power source are required to produce a magnetic field of a desirably high strength. Accordingly there is a limit to the magnetic field strength of the orientation process. Besides, the application of an excessively high strength magnetic field to the tape for the purpose of orientation tends to impair the surface smoothness of the magnetic coating.

SUMMARY OF THE INVENTION

It is an object of the present invention to provide an improved magnetic material comprising acicular particles of a magnetic substance for magnetic recording media, which magnetic material is higher in rectangular ratio and easier to orient the acicular particles in a magnetic layer formed by the application of the magnetic material to a base of a recording medium than conventional magnetic materials comprising analogous acicular particles.

A magnetic material according to the invention comprises acicular particles of a magnetic substance and a ferrite powder amounting to from about 0.5 to about 20% by weight of said acicular particles.

It is highly preferable that the particles of the ferrite powder are generally spherical or generally ellipsoidal in shape.

The acicular particles are of a known magnetic substance such as an iron oxide, iron or an alloy of ferromagnetic metals. The ferrite is selected from conventional ferrites such as Mn-ferrite, Zn-ferrite and Ni-ferrite.

Typically a magnetic material according to the invention is in the form of a uniform dispersion of acicular particles of a magnetic substance and generally spherical or ellipsoidal particles of a ferrite (in the aforementioned proportion of the ferrite particles to the acicular particles) in a dispersion medium comprising a high polymer serving as a binder, optionally with conventional additives such as a dispersant and a lubricant.

DESCRIPTION OF THE PREFERRED EMBODIMENTS

Example 1

A dispersion medium was prepared by dissolving 25 parts by weight of a binder, which was a mixture of a polyurethane elastomer and a copolymer of polyvinyl chloride with polyvinyl acetate, in 250 parts by weight of a solvent, which was a mixture (1:1:1 by volume) of toluene, methylethyl ketone and methyl isobutyl ketone.

A standard magnetic paint was prepared by adding 100 parts by weight of acicular particles (the axis ratio was from about 5:1 to about 17:1; about 0.6 μm in mean length) of $\gamma$—$Fe_2O_3$ to 275 parts by weight of the dispersion medium, together with 1 part by weight of dispersant (soybean lecithin), 3 parts by weight of lubricant (mixture of oleic acid and silicone oil) and 5 parts by weight of finely powdered graphite, and then stirring the resultant mixture for 20 hr to make it a uniform dispersion. By the same process, seven batches of magnetic paints additionally comprising a ferrite powder were prepared respectively by adding 0.5, 1, 5, 10, 15, 20 and 25 parts by weight of generally spherical particles (about 0.35 μm in mean diameter) of Mn-Zn ferrite to 275 parts by weight of the dispersion medium together with the $\gamma$—$Fe_2O_3$ particles and the additives used in the standard magnetic paint.

These magnetic paints were each applied onto a 12 μm thick film of polyester so as to give a magnetic coating about 6 μm in thickness (after drying). The coating of the film with each magnetic paint was performed by a continuous method, and the coated film in the wet state was passed through a magnetic field of a strength of 2200 oersteds produced by a conventional magnetic field orientation apparatus to orient the acicular magnetic particles in the coating. Thereafter the coated films were dried, subjected to calendering and slitted to a predetermined width. The magnetic properties of the thus produced magnetic tapes are presented in Table 1.

TABLE 1

| Amount of Mn-Zn ferrite (parts by weight) | Thickness of Magnetic Coating (μm) | Coercive Force (Oe) | Maximum Magnetic Flux Density (Gauss) | Rectangular Ratio, Rs |
|---|---|---|---|---|
| 0 | 6.0 | 320 | 1350 | 0.79 |
| 0.5 | 6.1 | 320 | 1360 | 0.81 |
| 1 | 6.0 | 320 | 1355 | 0.83 |
| 5 | 6.2 | 320 | 1342 | 0.84 |
| 10 | 6.3 | 325 | 1330 | 0.84 |
| 15 | 6.4 | 328 | 1310 | 0.84 |
| 20 | 6.4 | 325 | 1270 | 0.83 |
| 25 | 6.3 | 330 | 1200 | 0.83 |

Note:
$Rs = \frac{\text{Residual magnetic flux density}}{\text{Maximum magnetic flux density}}$ As can be seen in Table 1, the addition of the ferrite powder to the standard magnetic material (paint) in this example caused about 2–5% increase in the rectangular ratio Rs. The effect was appreciable even when the amount of the ferrite was 0.5 Wt% of the $\gamma$-$Fe_2O_3$ powder (acicular particles). However, the rectangular ratio became maximum when the ferrite powder amounted to 5–15 Wt% of the $\gamma$—$Fe_2O_3$ powder, and there occurred lowering of the maximum magnetic flux density as the amount of the ferrite powder was increased beyond 5 Wt% of the acicular magnetic particles.

From the results of numerous experiments including Examples in the present specification, a preferred range of the amount of ferrite particles in a magnetic material according to the invention was concluded to be from about 0.5 to about 20 Wt% of the acicular magnetic particles.

It is preferable that the ferrite particles in a magnetic material according to the invention have a mean particle size (diameter) in the range from about 0.2 to about 2.0 μm. Also it is important that the particle size of the ferrite powder is not larger than the thickness of a magnetic layer in a recording medium to be made of this magnetic material. If the particle size of the ferrite is larger than the thickness of the magnetic layer, the ferrite particles in the magnetic layer partly project from the outer surface of the magnetic layer and will cause undesirable phenomena such as dropout during use of the recording medium. As to the particle shape, it is preferred that the ferrite particles are generally sperical or generally ellipsoidal, i.e. they have a roundish shape, because the presence of ferrite particles having a pointed or sharp-edged shape in the magnetic layer of a recording medium will promote wear of magnetic heads for recording and reproducing.

Examples of conventional ferrites particularly suitable for the present invention are Mn-ferrite, Ni-ferrite, Zn-ferrite, Co-ferrite, Cu-ferrite, Mg-ferrite and compound ferrites thereof. Magnetite and maghemite are also useful.

The acicular magnetic particles in a magnetic material according to the invention are not different from those in conventional magnetic materials for recording media. Examples of useful magnetic substances are $\gamma$—$Fe_2O_3$, Co-containing $\gamma$—$Fe_2O_3$, $Fe_3O_4$, Co-containing $Fe_3O_4$, Fe, Fe—Co alloys and Fe—Co—Ni alloys, optionally added with other metal element(s). The selection of a magnetic substance can be made freely, but it is necessary that the selected magnetic substance is utilized in the form of fine and acicular particles which undergo orientation in a magnetic field or a reasonable strength. It is preferable that the acicular magnetic particles has a mean length in the range from about 0.3 to about 2.0 μm.

EXAMPLE 2

A standard magnetic paint was prepared by dispersing 100 parts by weight of acicular particles of Co-containing $Fe_3O_4$ (about 0.8 μm in mean length, and the axis ratio was from about 5:1 to about 17:1) in 275 parts by weight of the dispersion medium prepared in Example 1, together with 1 part by weight of dispersant (soybean lecithin), 3 parts by weight of lubricant (mixture of oleic acid and silicone oil) and 3 parts by weight of finely powdered graphite, by the process described in Example 1. By the same process, three batches of magnetic paints additionally containing a ferrite powder were prepared respectively by adding 0.5, 20 and 25 parts by weight of generally spherical particles of Mn-ferrite (about 1.2 μm in mean diameter) to 275 parts by weight of the dispersion medium together with the Co—$Fe_3O_4$ particles and the additives used in the standard magnetic paint.

Using these magnetic paints, four kinds of magnetic tapes were produced by the method of Example 1 except that the strength of a magnetic field for the orientation was 1800 oersteds. Table 2 shows the magnetic properties of these magnetic tapes.

TABLE 2

| Amount of Mn-ferrite (parts by weight) | Thickness of Magnetic Coating (μm) | Coercive Force (Oe) | Maximum Magnetic Flux Density (Gauss) | Rectangular Ratio, Rs |
|---|---|---|---|---|
| 0 | 4.5 | 595 | 1460 | 0.81 |
| 0.5 | 4.4 | 600 | 1450 | 0.83 |
| 20 | 4.6 | 608 | 1374 | 0.85 |
| 25 | 4.3 | 610 | 1320 | 0.84 |

EXAMPLE 3

A standard magnetic paint was prepared by dispersing 100 parts by weight of acicular particles of Co-containing $\gamma$—$Fe_2O_3$ (about 1.5 μm in mean length, and the axis ratio was from about 5:1 to about 17:1) in 270 parts by weight of a dispersion medium which was a solution of 20 parts by weight of a binder (a mixture of nitril rubber and a copolymer of polyvinyl chloride with polyvinyl acetate) in 250 parts by weight of the solvent used in Example 1, together with 1 part by weight of soybean lecithin, 3 parts by weight of the lubricant used in Example 1 and 5 parts by weight of finely powdered graphite, by the process of Example 1. By the same process, three batches of magnetic paints additionally containing Zn-ferrite were prepared respectively by adding 0.5, 20 and 25 parts by weight of Zn-ferrite powder, which was between spherical and ellipsoidal in particle shape and about 2.0 μm in mean particle size (diameter), to 270 parts by weight of the dispersion medium together with the acicular magnetic particles and the additives used in the standard magnetic paint.

Using these magnetic paints, four kinds of magnetic tapes were produced by the method of Example 1. Table 3 shows the magnetic properties of these magnetic tapes.

TABLE 3

| Amount of Zn-ferrite (parts by weight) | Thickness of Magnetic Coating (μm) | Coercive Force (Oe) | Maximum Magnetic Flux Density (Gauss) | Recutangular Ratio, Rs |
|---|---|---|---|---|
| 0 | 4.5 | 655 | 1360 | 0.82 |
| 0.5 | 4.2 | 660 | 1345 | 0.84 |
| 20 | 4.5 | 675 | 1260 | 0.87 |
| 25 | 4.6 | 680 | 1210 | 0.85 |

As will be understood from the foregoing description, a magnetic material according to the invention is of use in the production of various kinds of magnetic recording media such as magnetic tapes and magnetic sheets for audio and video recorders and magnetic cards for computers, and the use of this magnetic material makes it possible to afford improved rectangular ratio to the recording media by a conventional orientation process.

What is claimed is:

1. A magnetic material for magnetic recording media, comprising:
   acicular particles of a magnetic substance selected from the group consisting of $\gamma$—$Fe_2O_3$, Co-containing $\gamma$—$Fe_2O_3$, and Co-containing $Fe_3O_4$, said acicular particles having a mean length in the range of from about 0.3 μm to about 2.0 μm; and particles of a ferrite selected from the group consisting of Mn-ferrite, Zn-ferrite and Mn—Zn ferrite, said particles of said ferrite amounting to from about 0.5% to about 20% by weight of said acicular particles and having a generally spherical particle shape and a mean particle size in the range of from about 0.2 μm to about 2.0 μm.

2. A magnetic material for magnetic recording media, comprising:

acicular particles of a magnetic substance selected from the group consisting of $\gamma$—$Fe_2O_3$, Co-containing $\gamma$—$Fe_2O_3$, and Co-containing $Fe_3O_4$, said acicular particles having a mean length in the range of from about 0.3 μm to about 2.0 μm; and particles of a ferrite selected from the group consisting Mn-ferrite, Zn-ferrite and Mn—Zn ferrite, said particles of said ferrite amounting to from about 0.5% to about 20% by weight of said acicular particles and having a generally ellipsoidal particle shape and a mean particle size in the range of from about 0.2 μm to about 2.0 μm.

3. A magnetic material according to claim 1, or 2, further comprising a high polymer as a binder, said acicular particles and said particles of said ferrite being uniformly dispersed in said binder.

\* \* \* \* \*